Sept. 24, 1968      S. A. DOLD      3,403,272
LINEAR AND ROTARY ELECTRIC MOTORS ADAPTED FOR USE AS COUNTERS
Filed Nov. 8, 1965      6 Sheets-Sheet 1

INVENTOR
Siegfried August Dold by

Sept. 24, 1968 S. A. DOLD 3,403,272
LINEAR AND ROTARY ELECTRIC MOTORS ADAPTED FOR USE AS COUNTERS
Filed Nov. 8, 1965 6 Sheets-Sheet 2

INVENTOR
Siegfried August Dold by

INVENTOR
Siegfried August Dold

Sept. 24, 1968  S. A. DOLD  3,403,272
LINEAR AND ROTARY ELECTRIC MOTORS ADAPTED FOR USE AS COUNTERS
Filed Nov. 5, 1965  6 Sheets-Sheet 5

INVENTOR
Siegfried August Dold by

INVENTOR
Siegfried August Dold

United States Patent Office 3,403,272
Patented Sept. 24, 1968

3,403,272
LINEAR AND ROTARY ELECTRIC MOTORS ADAPTED FOR USE AS COUNTERS
Siegfried August Dold, Rheinberg, Germany, assignor to Emil Ewald Josef Underberg, Rheinberg, Germany
Filed Nov. 8, 1965, Ser. No. 506,744
Claims priority, application Germany, Nov. 11, 1964, U 11,199
10 Claims. (Cl. 310—12)

The present invention relates to an electric machine with a stator and a rotor, especially with stator and rotating armature, for instance, an electric motor. With heretofore known electric machines—generators and motors, the stator has arranged therein a pair of different poles, i.e., cooperating magnetic north poles and south poles, between which the armature rotates. The poles provided in the armature or forming therein are attracted by the respective poles of opposite polarity in the coils of the stator. At the instant of the strongest attraction, an electric reversal is effected by a collector whereby the field of magnetic forces will be interrupted at the pole just being attracted with the greatest force and becomes effective with the next following pole. A continuous repetition of this play brings about the rotation of the armature. With polyphase induction motors, a rotating magnetic field—a rotary field—is produced in the stator which is followed by the armature which latter thereby rotates.

It is an object of the present invention to provide an electric machine in which the movement of the rotor or the rotation of the armature will be effected without interruption of the armature current and without the creation of a rotary field and without other heretofore known electric means, so that the heretofore known arrangements for the above purposes can be omitted.

It is another object of this invention to provide an electric machine as set forth in the preceding paragraph with improved properties and new possibilities of employment.

These and other objects and advantages of the invention will appear more clearly from the following specification in connection with the accompanying drawings, in which:

FIGURE 1 diagrammatically illustrates an electric machine according to the invention with a stator and a rotor, said machine being shown in its first phase of magnetization and movement;

FIGURES 2 to 4 illustrate the machine of FIGURE 1 in three further phases of operation;

FIGURE 5 diagrammatically illustrates a radial cross-section through a machine according to the invention;

FIGURES 6 to 8, respectively, diagrammatically illustrate a portion of a cross-section according to FIGURE 5 in three different phases of operation;

FIGURE 9 diagrammatically represents a strip-like stator and a trolley-like rotor;

Figure 1:
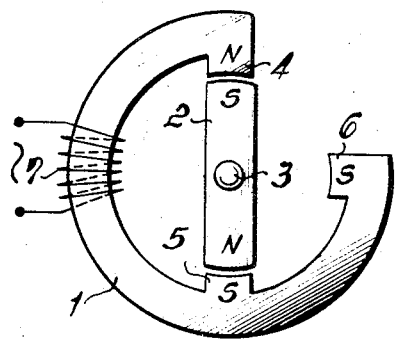
Figure 2:
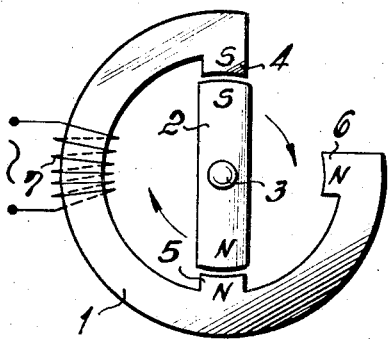
Figure 3:
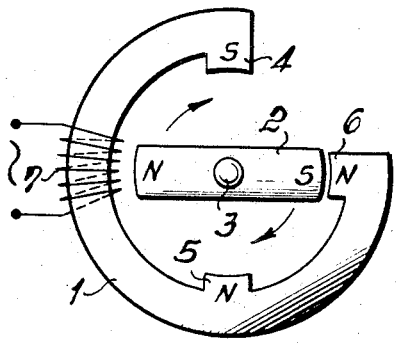

An electric machine according to the present invention is characterized primarily in that each pair of poles has associated therewith a shunt or parallel pole in order to create a preferred direction of movement when poles of the same polarity respectively pertaining to the stator and the rotor face each other or are arranged opposite to each other. This means that, for instance, a north pole has associated therewith two south poles, or a south pole has associated therewith two north poles so that the corresponding poles in the rotor or movable part of the machine will be moved in a preferred direction inasmuch as in only one direction they find a corresponding pole of opposite polarity. The advantage of such an arrangement consists primarily in an improved possibility of control, especially by means of the frequency, an improved degree of efficiency and the possibility of discarding a collector.

According to one embodiment of the present invention, the machine is in a manner known per se designed as motor with a stator and a rotating rotor, while the shunt poles are arranged in the stator. The rotor of the machine may in a manner known per se be formed by permanent magnets when small outputs suffice or may be formed by corresponding electric coils when a higher output is required.

According to another embodiment of the invention, the stator is designed as a longitudinal rail or strip, while the rotor is formed by a trolley-like member movable along said rail and comprising a pair of poles with a shunt pole. With such an arrangement, the rotor is preferably designed as riding on the stator. In this way, a transporting switch or other control device is created which will make it possible by current impulses or by longer periods of operation to produce linear movements.

When, in conformity with the present invention, the shunt or parallel pole is surrounded by an electric coil, the reactance current properties of the machine can be greatly improved.

The present invention also comprises an embodiment which is characterized in that the machine for use as a counter is equipped with a pair of poles and a parallel pole and that the winding of the stator, through the interposition of a relay or another suitable device for producing impulses of alternating polarity, is provided with a direct current source, the relay or the device being excited in the rhythm of the articles to be counted. As an alternative, the machine may be equipped with one pair of poles each and one parallel pole each for positive and negative counting impulses and is employed as integrating counter for forming the total of positive and negative members which have been induced in the form of impulses. The shunt or parallel pole of the pole pair for counting the negative members must be arranged opposite to the shunt or parallel pole of the pole pair for counting the positive members.

Referring now to the drawings in detail and FIGS. 1 to 4 thereof in particular, illustrating the principle of a machine according to the present invention, these figures show a stator 1 and a rotor 2 which is rotatably supported by a shaft 3. Stator 1 has substantially the shape of a horseshoe magnet with one leg extended in order to form a further pole between the leg ends. In this way, stator 1 has the poles 4, 5 and 6 of which the poles 5 and 6 are arranged adjacent to each other and, more specifically, are arranged in parallel arrangement so that pole 6 may be designated as shunt pole or parallel pole with regard to pole 5. Between poles 4 and 5, stator 1 is equipped with a coil 7 to which is applied an alternating current voltage. Rotor 2 is designed as a permanent magnet.

Figure 4:
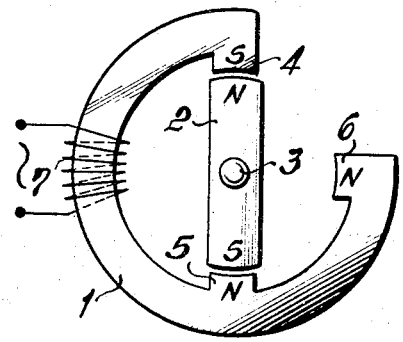

During the first phase, according to FIG. 1, the stator pole 4 forms a north pole, whereas each of the stator poles 5 and 6 forms a south pole. These poles attract the corresponding poles of opposite polarity of rotor 2 so that the latter will assume a position illustrated in FIG. 1. If now, in the course of the frequency of the alternating current voltage, the polarity of the stator pole of coil 7 changes, there will be obtained the phase illustrated in FIG. 2 according to which poles of the same polarity of the stator and rotor face each other. While these poles repel each other, it will be appreciated that in the neutral position of the rotor with regard to the stator, at least theoretically, this repelling is not effected in any preferred direction, which means that the repelling forces are of the same magnitude toward both sides and thus cancel each other out, so that the rotor will remain in its neutral position. However, due to the provision of the shunt pole 6, rotor 2 is pulled out by said shunt pole from its neutral position. The shunt pole conveys to the rotor a preferred direction of movement, viz. in clockwise direction. According to FIG. 3, the north pole in shunt pole 6 attracts the south pole of the rotor and the latter performs a quarter of a complete revolution. Inasmuch as at the end of this quarter revolution the attracting forces of poles 4 and 5 again become effective, the rotor continues its rotation and completes half of a complete revolution (FIG. 4). This half-revolution corresponds to half of the complete oscillation of the applied alternating current voltage, and when the second half of the oscillation starts, the reverse magnetization of the stator 1 will start and thus the cycle described above will be repeated, but with reverse polarities. In this way, rotor 2 will eventually carry out a complete revolution which corresponds precisely to a complete oscillation of the alternating current voltage. Assuming a frequency of 60 cycles per second, the rotor will perform 60 revolutions per second. Thus, the speed of the machine can be controlled via frequency.

Figure 5:
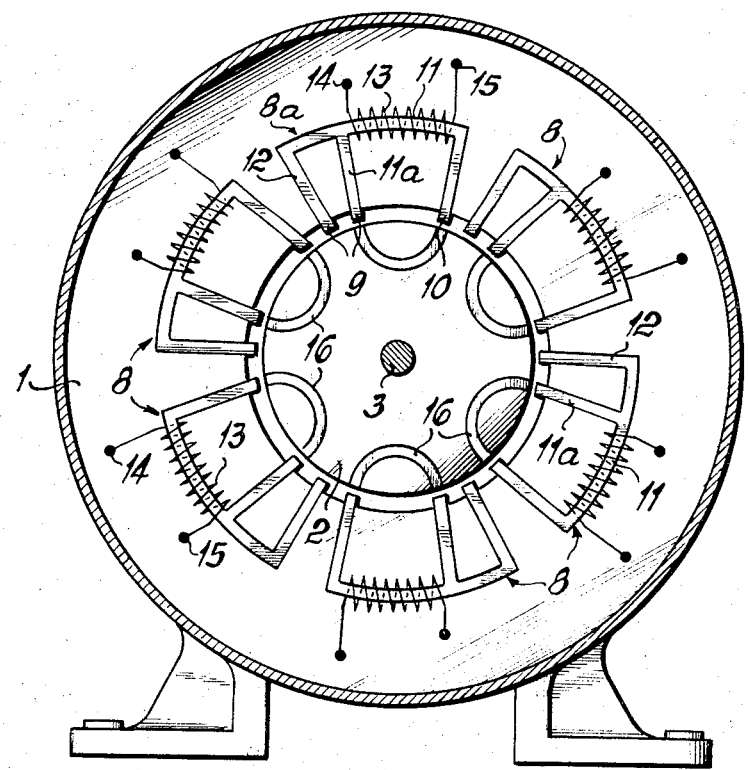

FIG. 5 diagrammatically illustrates an electric motor employing the principle outlined above. The motor comprises a stator 1 and a rotor 2 rotatably supported by a shaft 3. Rotor 2 is designed as a solid cylinder and is provided with permanent magnets 16. Arranged on the circumference of rotor 2 in stator 1 are pole groups 8 each of which has three poles, viz., two adjacent poles of the same polarity and a third pole which has a polarity opposite to the polarity of said two adjacent poles. For instance, pole group 8a has two south poles 9 and one north pole 10, or vice versa. According to the specific showing in the drawing, each group has a U-shaped steel core 11 one leg 11a of which is connected with a parallel leg 12 which latter may either form one single piece with part 11 or may be connected thereto as a separate part, for instance, by riveting. Core 11 is surrounded by an electric coil 13 with terminals 14 and 15. The remaining pole groups of stator 1 are designed in a corresponding manner. Coils 13 may be arranged parallel or in series with regard to each other. According to a test machine designed in conformity with the present invention, merely two pole groups with parallel poles 12 as stator were arranged on the circumference of a permanent magnet rotor. The pole group was detachable, and it has been found that the test machine will run as motor also with one pole group only. The machine was connected to a source of alternating current voltage of 220 volts.

Figure 6:
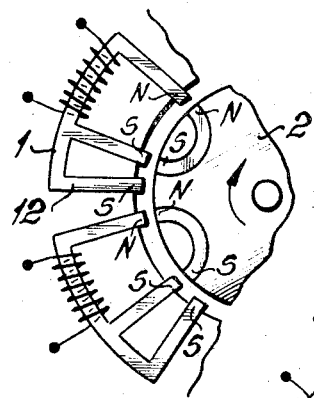
Figure 7:
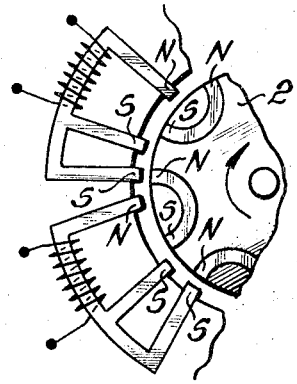
Figure 8:
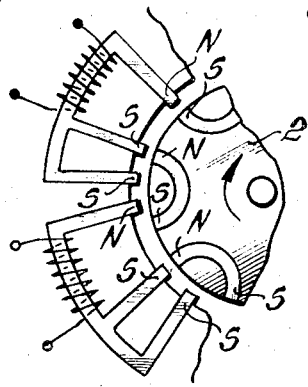

FIGS. 6 to 8 illustrate the effect of the parallel poles of the motor according to FIG. 5. The poles are shown in the drawing as north and south poles, and parallel pole 12 accordingly has been shown as a south pole. The polarity at one side of the rotor corresponds to the polarity at the opposite side of the stator.

Inasmuch as poles of the same polarity repel each other while the poles of opposite polarity tend to attract each other, it will be appreciated that the phase illustrated in FIG. 6 will result in the condition shown in FIG. 7, which means a step of movement of rotor 2 in clockwise direction. This preferred direction during the movement is a result of the parallel poles on the stator, because these last-mentioned poles repel the respective pole of the same polarity on the rotor, and attract the pole of opposite polarity. A movement in counter-clockwise direction would be impossible.

The next phase illustrated in FIG. 8 corresponds to the fourth phase of FIG. 4. Thus, the reversal of the pole groups of the stator will take place which reversal will, when employing alternating current, follow automatically in view of the sine-shaped cycles, and in this instance, the machine will operate as a synchronous motor.

After effected reversal of the polarity, the situation will correspond to that of FIG. 5, with the exception that the polarity of the individual magnetic heads has changed and consequently, the rotor will be forced to carry out its next step of movement in the preferred direction, viz., in clockwise direction because the respective parallel poles will exclude a movement in another direction. When the said steps which have been described above follow each other in uninterrupted succession, a uniform rotation of the armature 2 about its shaft 3 will be obtained and there will exist the possibility of driving corresponding devices, as is generally customary with electric motors.

Figure 10:
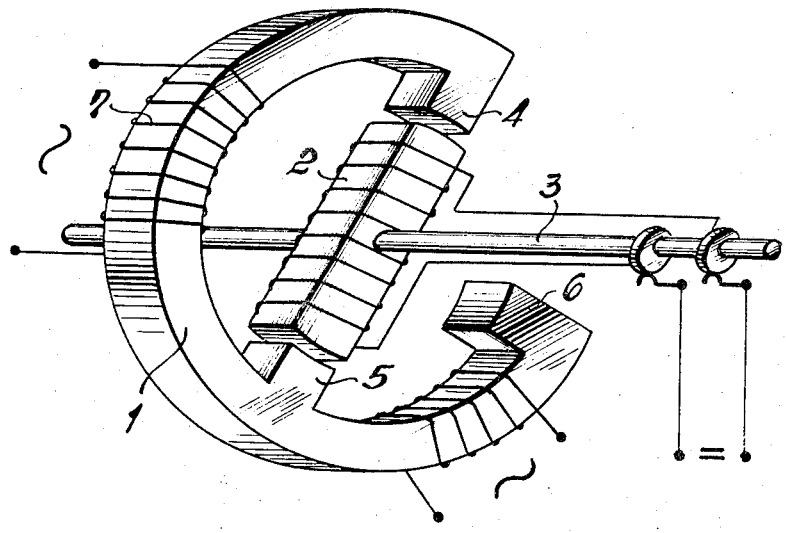
FIGURE 10 is a diagrammatical perspective view of an embodiment of this invention, in which the rotor is provided with an extra coil connected to an electric source of energy through collector rings that are mounted on the rotor shaft.

As represented for example in FIGURE 10, the magnetism in the rotor may, of course, also be produced electrically in a manner known per se by providing the rotor with coils which, through collector rings, are connected to a direct current source. On the other hand, the stator may be provided with additional coils which, for instance, surround the parallel poles 12 and will produce an electric generator effect when the rotor turns.

When applying 50-cycle alternating current to the rotor windings, at least theoretically, a speed of 3,000 revolutions per minute will be obtainable.

Figure 9:
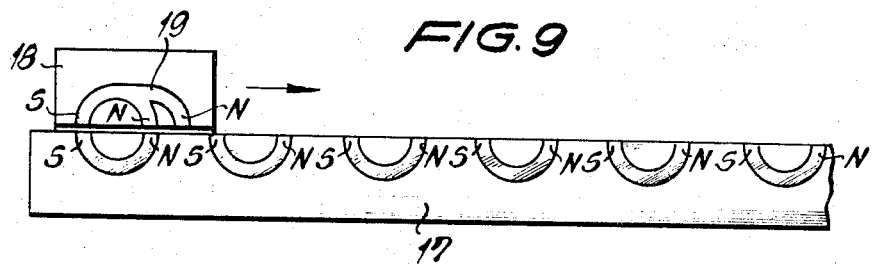

FIG. 9 shows a further realization of the principle according to the present invention. More specifically, the arrangement of FIG. 9 represents a recilinearly extending stator 17 with successive north and south poles and a rotor 18 riding on the stator 17. Rotor 18 comprises a pair of poles with a shunt pole 19 by means of which a preferred direction of movement is conveyed to the rotor 18 on stator 17. When inducing an electric impulse into the system, the rotor moves on the stator forward by one step, for instance, a step of one centimeter length. With ten impulses of alternating polarity, it is thus possible to cause the rotor to advance by ten centimeters. Such an arrangement can be employed for numerous purposes.

Figure 11:
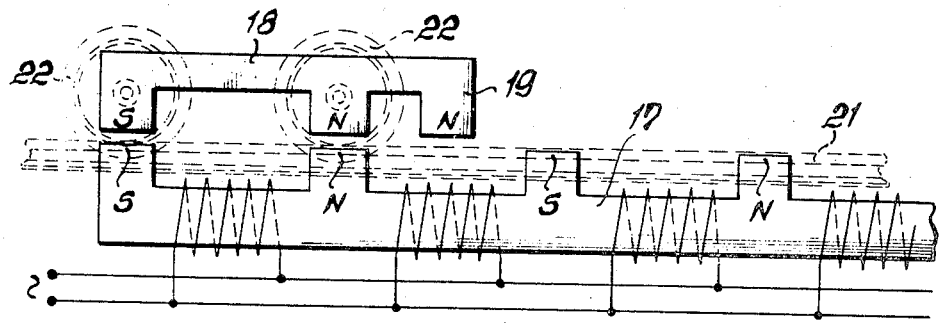
FIGURE 11 is another embodiment of this invention based upon a principle similar to that of FIGURE 9, with a strip-like stator and a trolley-like rotor, the strip-like stator including additional coils for the generation of the electromagnetic field.
Figure 12:
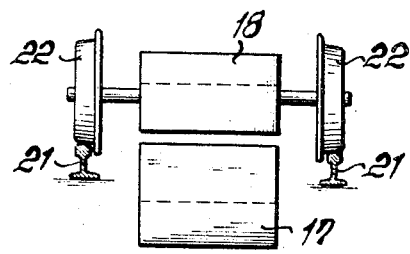
FIGURE 12 is a front-elevational view of the structure of FIGURE 11.

FIGURE 11 represents another embodiment of this invention employing the same principle as the machines described in conjunction with FIGS. 1 to 9. In this case, as in FIG. 9, it is the rotor part 18 which is provided with the parallel pole 19. The rail-like member 17 is provided with protruding parts forming the electromagnetic poles for causing the movement of the rotor member 18. The poles S, N of the rail-like member 17 functioning as a stator are spaced apart the same distance as the poles S, N of the rotor member 18. As may clearly be seen in the front view of FIG. 12, rotor member 18 is supported by means of wheels 22 on bars 21. In FIG. 11, the individual coils are visible as they are mounted between subsequent poles and as they are connected in parallel to a source of alternating electric current. Depending on the oscillations of the electric current, the polarity of the poles of the rail-like member 17 is varied and, in conformity with the frequency of the oscillations, rotor member 18 moves toward the end of the rail-like member 17 which is located at the right side of FIG. 11.

A further employment possibility for the present invention consists in designing the machine as a counter. In such an instance, electric impulses are introduced into the stator which impulses are released by articles to be counted, whereupon the steps of movement discussed above in connection with FIGS. 1 to 4 are effected in a discontinuous manner, and for instance produce the stepwise advance of a pointer over a dial or of a roller counter mechanism. As source of current for the electromagnets in the stator, in such an instance a direct current producer may be employed, for instance an accumulator battery. The effectiveness of the counter mechanism is again based on the single preferred direction permitted by the respective pole. If, for instance, the counting of bottles is involved, it is possible to move such bottles through a light beam which affects an electric cell which, in turn, acts upon a relay. This relay then emits direct current impulses of regularly alternating polarity and conveys the same to the stator winding of the machine.

Figure 13:
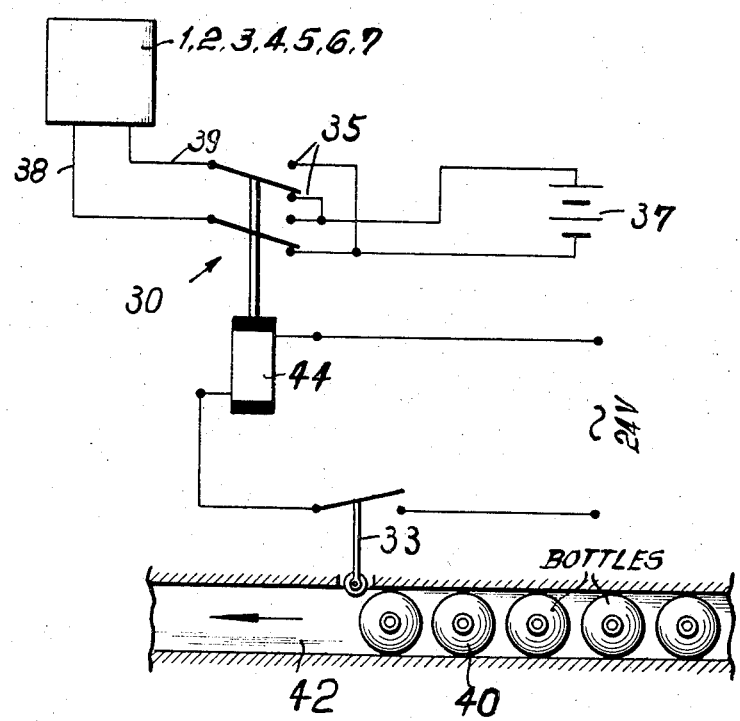
FIGURE 13 shows a preferred electric circuit for controlling the electric machine of this invention when used as a counter.

As illustrated in FIG. 13, the machine comprising the parts 1 to 7 is connected to a source of direct electric current, for instance an accumulator battery 37, through leads 38, 39 and a switch 30. Switch 30 is provided with contacts 35 and is movable into two different positions. In one of these two positions switch 30 connects the machine with the two terminals of battery 37 in one way, whereas in the second position the machine is connected to the terminals of battery 37 in the opposite way.

Bottles 40 may then travel through the channel 42 and, while passing by a feeler or interrupter 33, actuate this feeler 33 thereby closing or disconnecting an electric circuit including an electromagnetic relay 44. Relay 44, in turn, according to whether it is conducting a current or not, will hold switch 30 in its one position or move it into its before mentioned other position.

The effectiveness of the counter mechanism is again based upon the single preferred direction permitted by the respective pole.

Instead of using the mechanical feeler 33, it is possible to let bottles 40 pass a light beam affecting a photo cell which, in turn, will act upon the electric circuit with relay 44. Accordingly, as caused by feeler 33, current impulses of regularly alternating polarity will likewise be impressed upon the machine with elements 1 to 7 and cause rotation thereof depending upon the frequency of bottles 40 passing by the photo cell.

Finally, it is also possible to employ the present invention in connection with the adding and subtracting of impulses and so-called "prell" impulses, which means the machine may be employed as integrating counter which latter forms a total from positive and negative members. As an example of employment for such an arrangement, there may be mentioned the transformation of signals of a weather feeler into control commands for an electric heating device. The principle of positive and negative movements may also be realized in connection with program controls, for instance of a washing machine, where is will make possible the automatic repetition of operations.

Figure 14:
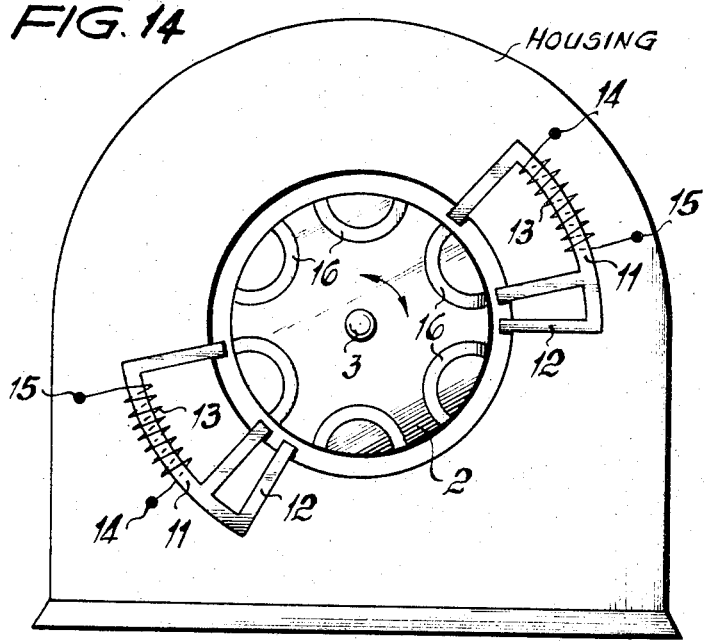
FIGURE 14 represents another embodiment of this invention with a special arrangement of the stator poles.

An example of such a machine is illustrated in FIG. 14. As may be clearly recognized, the stator comprises two pairs of electromagnetic poles including the core 11 and coils 13 with terminals 14, 15 surrounding the core. Thus far, there is no difference of any significance compared with the machine of FIG. 5. However, when looking in one and the same direction of rotation, the shunt pole 12 of one pair of poles is located in front of the pair of poles it is connected to, while the other pair of poles has the shunt pole 12 arranged therebehind. Accordingly, depending upon the polarity of the pulses entering coils 13, in this embodiment rotor 2 will travel in a clockwise or a counter-clockwise direction, thereby acting as an integrating counter.

It is to be understood that the features outlined above may be employed individually or in any desired combination for realizing various embodiments of the present invention.

It is also to be understood that the present invention is, by no means, limited to the particular arrangements shown in the drawings, but also comprises any modifications within the scope of the appended claims.

What I claim is:
1. An electric machine which includes: a first member having means adapted to function as at least one first group of a north pole and a south pole, and a second member having means adapted to function as at least a second group of a north pole and a south pole, one of said members being movable and the other one of said members forming a stator, all of the groups of one of said members including means adapted to function as a third pole with the poles of said last-mentioned member pertaining to one and the same group arranged one behind the other with regard to the movement of the movable member relative to the stator and having two succeeding poles of one and the same group of the same polarity and the third pole of opposite polarity whereby said movable member is given a preferred direction of mmovement.

2. An electric machine according to claim 1, in which that one of said two members which forms the stator has at least one group with three poles.

3. An electric machine according to claim 1, in which said stator is formed by longitudinal strip means, and in which the member comprising means functioning as three poles is movable adjacent said stator in longitudinal direction thereof.

4. An electric machine according to claim 3, in which the member comprising means functioning as three poles is slidably mounted on said strip means.

5. An electric machine according to claim 1, in which the means adapted to function as a third pole includes an electromagnet.

6. An electric machine according to claim 1, in which said movable member is formed by a permanent magnet.

7. An electric machine according to claim 1, in which both the stator and said movable member have electric coils for respectively creating their poles, one of the coils pertaining to said stator being adapted to be connected to alternating current, one of the coils pertaining to said movable member being adapted to be connected to direct current.

8. An electric machine according to claim 1, in which said stator has electromagnetic coils for creating its poles with the spacing of said last-mentioned poles provided in conformity with the spacing of the poles of said movable member.

9. An electric machine according to claim 1, in which for purposes of operating as a counter mechanism said first member forms the stator and comprises electromagnetic means for producing three magnetic poles and in which said electromagnetic means includes electric means for creating impulses of alternating polarity by connection with a direct current source, whereby said electric means is adapted to be energized in the rhythm of articles to be counted.

10. An electric machine according to claim 1, having a first pair of poles with a first shunt pole and a second pair of poles with a second shunt pole, said first and second shunt poles being connected with their respective pairs of poles in opposite order with respect to the sense of rotation, said first pair being adapted to react to positive counting pulses and said second pair being adapted to react to negative counting pulses, said machine being applicable as integrating counter for forming the total of positive and negative members entered into the machine in the form of corresponding impulses.

References Cited
UNITED STATES PATENTS

| 2,465,824 | 3/1949 | Thomas | 310—254 |
| 2,730,301 | 1/1956 | Beamish | 235—98 |
| 3,174,088 | 3/1965 | Muller | 318—138 |
| 3,189,771 | 6/1965 | Danek | 310—156 |

MILTON O. HIRSHFIELD, *Primary Examiner.*

WARREN E. RAY, *Assistant Examiner.*